Oct. 7, 1958
H. VERMETTE
2,855,207
SCROLL CHUCK WITH SPRING-ACTUATED HAMMER LUGS
Filed April 2, 1957
6 Sheets-Sheet 1
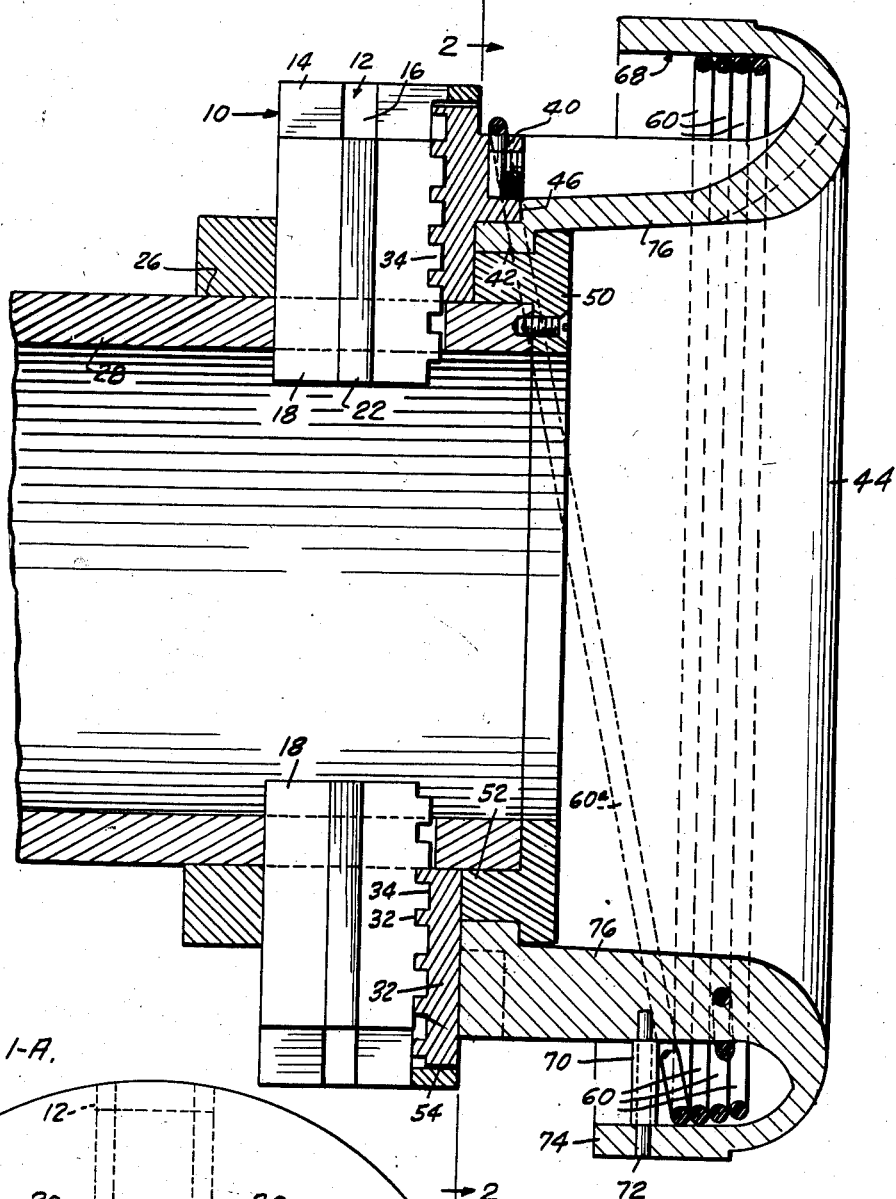
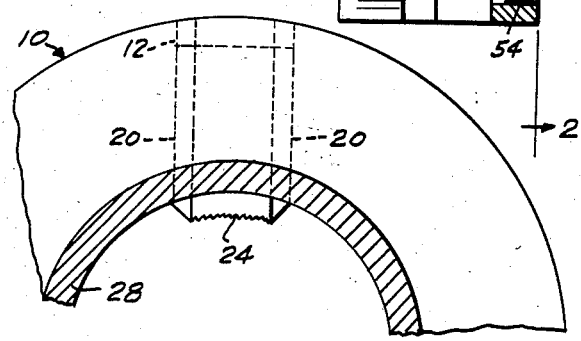
INVENTOR.
HOWARD VERMETTE
BY
Harry H. Hitzeman
ATTORNEY

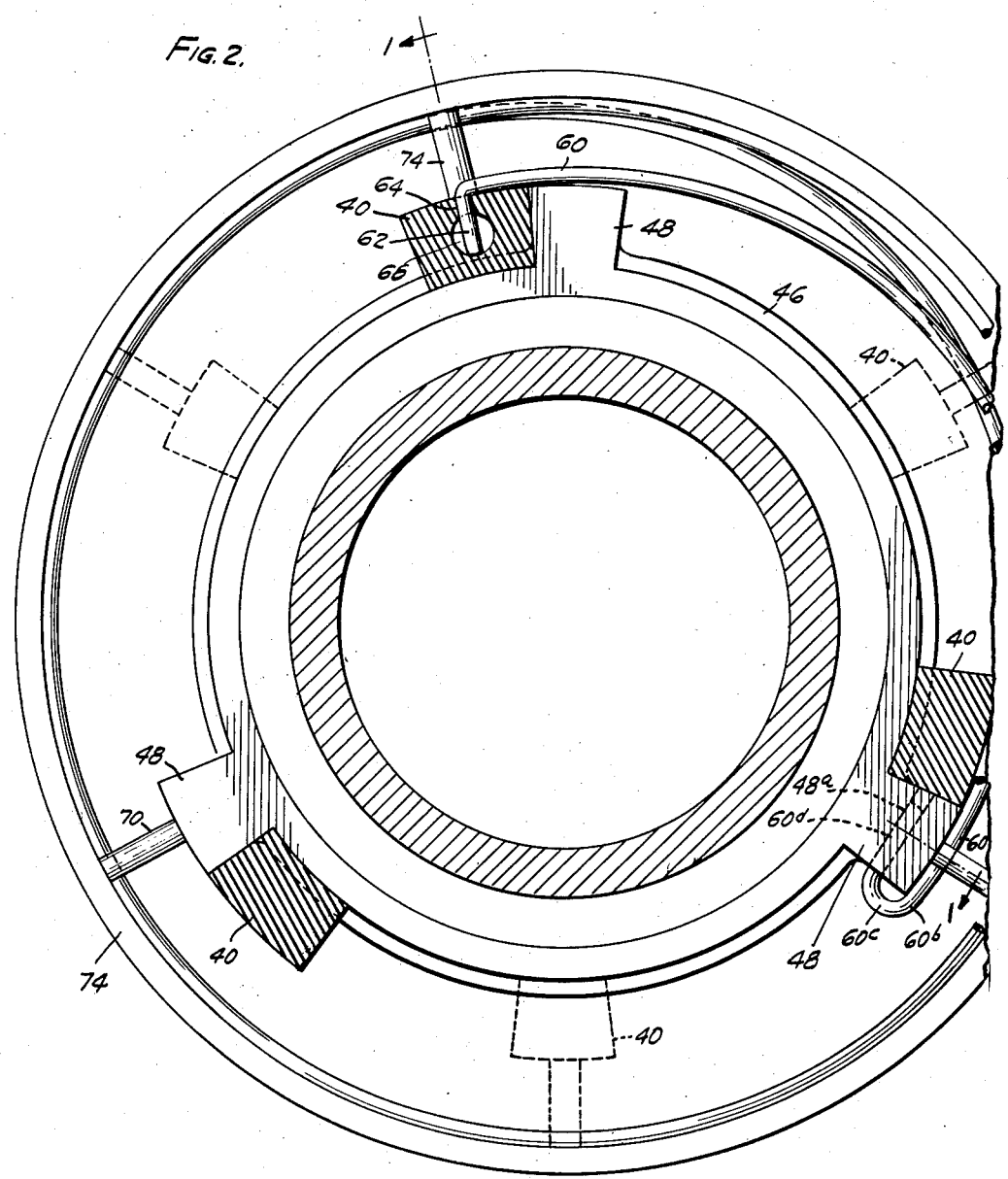

Oct. 7, 1958  H. VERMETTE  2,855,207
SCROLL CHUCK WITH SPRING-ACTUATED HAMMER LUGS
Filed April 2, 1957  6 Sheets-Sheet 3

INVENTOR.
HOWARD VERMETTE
BY
Harry H. Hitzeman
ATTORNEY

Oct. 7, 1958     H. VERMETTE     2,855,207
SCROLL CHUCK WITH SPRING-ACTUATED HAMMER LUGS
Filed April 2, 1957     6 Sheets-Sheet 4

INVENTOR.
HOWARD VERMETTE
BY
Harry H. Hitzeman
ATTORNEY.

Oct. 7, 1958

H. VERMETTE 2,855,207

SCROLL CHUCK WITH SPRING-ACTUATED HAMMER LUGS

Filed April 2, 1957

INVENTOR
HOWARD VERMETTE
BY Harry H. Hitzeman
ATTORNEY.

Oct. 7, 1958 H. VERMETTE 2,855,207
SCROLL CHUCK WITH SPRING-ACTUATED HAMMER LUGS
Filed April 2, 1957 6 Sheets-Sheet 6

INVENTOR
HOWARD VERMETTE
BY
Harry N. Hitzeman
ATTORNEY.

United States Patent Office 2,855,207
Patented Oct. 7, 1958

2,855,207

SCROLL CHUCK WITH SPRING-ACTUATED HAMMER LUGS

Howard Vermette, Hammond, Ind.

Application April 2, 1957, Serial No. 650,234

10 Claims. (Cl. 279—114)

My invention relates to improvements in chuck construction, and generally to that type of chuck or work holder construction which has work holding surfaces and adjusting means for moving said surfaces to a work holding position.

One such type of chuck is the type which is used for holding lengths of pipe to be cut off or threaded by a cutter or threading die that is held stationary, the pipe being rotated by the chuck.

These chucks are sometimes referred to as scroll type chucks, and my invention is particularly directed to chucks of the type where the final tightening or loosening of the work gripping jaws is effected by inertia type hand wheels, otherwise known as hammer chucks. Light weight being complimentary to portable equipment such as pipe threading machines, it is not desirable to use heavy weighted hand wheels. However, the simplicity of this type of chuck makes it the most desirable for use of this kind.

It being a well known fact that inertia is the product of mass and speed, my invention contemplates the provision of a connection between the scroll disc and the hand wheel consisting of one or more springs which may be loaded so that a light-weight hand wheel can acquire the speed to accumulate the necessary kinetic energy to lock or unlock the jaws on work placed therein.

The principal object of the present invention is to provide a work holder having movable work holding surfaces, adjusting means for moving the same, and spring mechanism associated therewith in such manner that through the spring action a pounding or hammer effort is obtained in tightening work between the work holding surfaces.

A further object of the invention is to incorporate one or more springs in a light-weight hand wheel or other weight for acquiring the speed and momentum to effect the hammer or pounding operation in structure of the type described.

A further object of the present invention is to provide an improved structure of hand wheel and scroll disc connection including spring mechanism associated therewith, for spinning the hand wheel in either a clockwise or counterclockwise direction to force the chuck jaws tight on to the work or to release the same from holding the work.

For a more comprehensive understanding of the construction above referred to and its operation, reference is had to the accompanying drawings, upon which:

Fig. 1 is a fragmentary cross-sectional view of a work supporting chuck embodying my invention;

Fig. 1-A is a fragmentary front view showing a portion of the scroll disc chuck body and one of the jaws;

Fig. 2 is a cross-sectional view thereof taken on the line 2—2 of Fig. 1;

Figure 3:
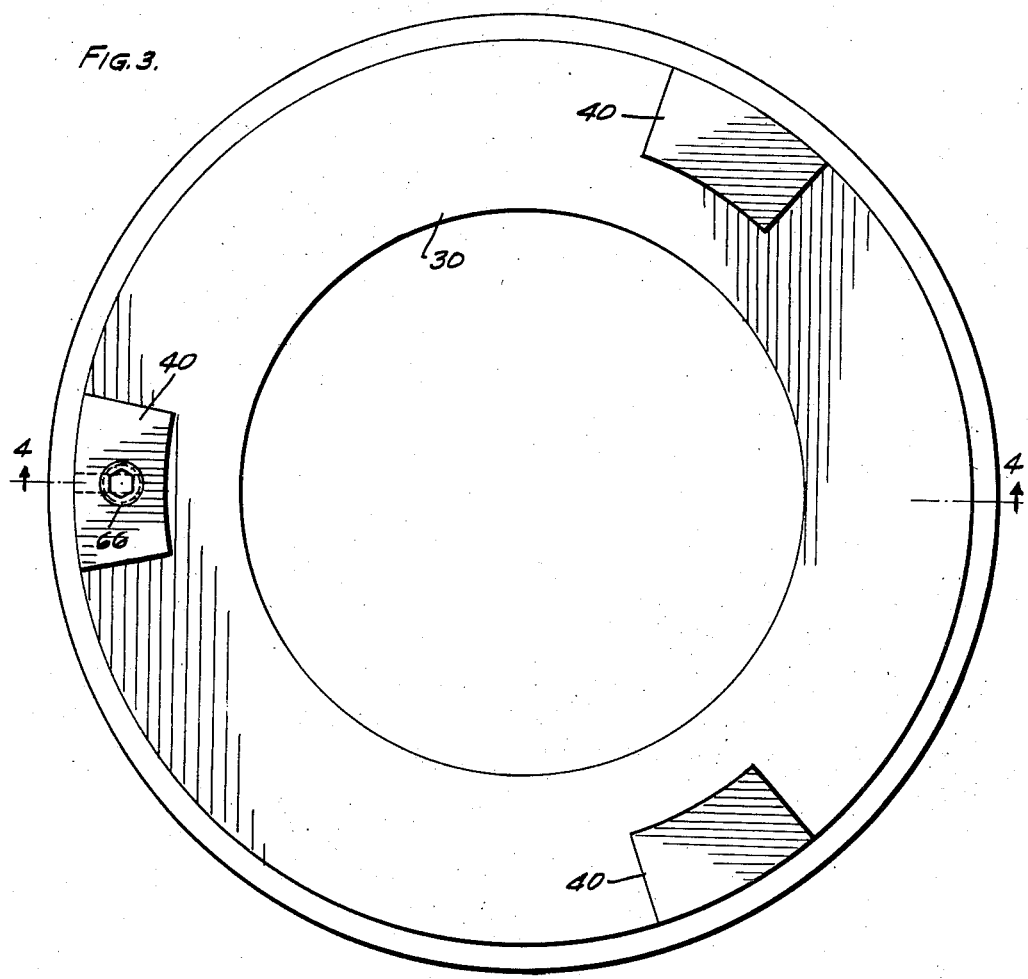
Fig. 3 is a plan view of the scroll chuck showing the location of the dogs on the back face of the same.
Figure 4:
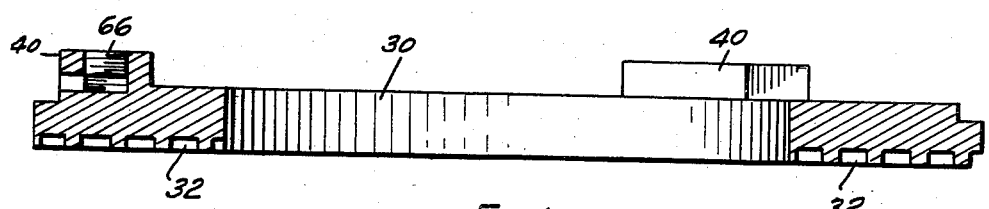
Fig. 4 is a cross-sectional view thereof taken on the line 4—4 of Fig. 3.

In the embodiment of the invention which I have chosen to illustrate and describe the same, the essential elements of the combination may include a chuck body 10 that has a plurality of radially disposed slots 12, each of which has the parallel side walls 14 and medially disposed grooves 16. Inwardly and outwardly movable jaw members 18 are mounted one in each of the slots 12, the jaw members having parallel side walls 20 complementary to the walls 14 of the slots 12, and tongue members 22 complementary to and disposed within the grooves 16.

The work holding jaws 18 each have arcuately shaped serrated work gripping surfaces 24 on their inner faces, and the chuck body may have an axial bore 26 to receive a hollow drive shaft 28 connected as desired to the operating machine upon which the chuck is mounted.

A scroll disc 30 may be mounted for rotation upon the hollow shaft 28, the scroll disc having upon one face a spiral scroll 32 provided with generally rectangularly shaped grooves 34 to receive the arcuately disposed and outwardly projecting teeth 38 on the face of each of the jaw members 18. Thus far the construction is generally similar to that presently employed in devices of this type.

In order to effect a hammer action for the final tightening of the jaws on a work piece, or for starting the release of the tightened jaws as hereinbefore described, I have provided a plurality of radially disposed lugs or dogs 40 upon the back face of the scroll disc 30, the same being so positioned that they may engage over a circular collar portion 42 of a hand wheel 44. The hand wheel, as best shown in cross-section in Fig. 1, has a shoulder portion 46 which receives the dogs 40, there being upstanding hammer lugs 48 above the shoulder 46 at spaced intervals about the circumference of the ledge, and there being as many hammer lugs 48 as there are radially disposed dogs 40 on the scroll disc.

The hand wheel 44 may be held for rotation on the end of the hollow shaft 28 by means of a ring collar 50 that has an upstanding ledge 52 for also holding the scroll disc in position in the shallow counter-bore 54 in the face of the chuck body 10.

As thus far described, the handle 44 could be rotated and as the hammer lugs 48 move against the dogs 40 on the scroll disc, the same would be rotated in either direction to move the jaws 18 inwardly toward work, or outwardly away from the same. However, in order to effect a hammer blow operation with a light-weight hand wheel, I have provided a spring connection between the scroll disc and the hand wheel, the spring being loaded by partial rotation of the hand wheel so that when it is released it will rotate under the influence of the spring and give an inertia blow or strike the dogs 40 on the scroll disc.

For this construction I provide a spring member 60 which is in the nature of a coiled spring having an end 62 connected through an opening 64 in one of the dogs 40 of the scroll disc. The end 62 of the spring is effectively held in position by a screw member 66. The several coils of the spring 60 are adapted to be carried in a circular recess 68 in the hand wheel 44, the first partial turn 60a being turned downwardly and under a holding roller 70 mounted on a pin 72 between the outer flange 74 and the inner flange 76 of the hand wheel. One of the holding rollers is provided between each of the hammer lugs 48 and the outer flange 74 of the handle.

The opposite end 60b of the spring 60 (see Fig. 2) is formed with a hook portion 60c having an end 60d that is hooked into a drilled opening 48a in one of the hammer lugs 48. Thus when the hand wheel is rotated in a direction to move the hammer lugs 48 away from the dogs 40 on the scroll disc and the hand wheel is released, the spring will rotate the hand wheel towards the dogs 40 with a pounding action. In this manner a tightly wedged grip of the jaw members upon a work piece is easily dislodged and the work piece can easily be removed.

Since long pieces of pipe or rods are frequently placed in a chuck of this type, especially when used as a pipe threading machine, it is a well known fact that the very weight of the pipe or load creates a wedging action with the teeth of the jaws so that it is sometimes necessary to use a hammer or other tool to attempt to rotate the hand wheel to loosen the connection between the jaws and the work piece. With the spring loaded hand wheel as described, the necessity for using hammers or other tools is eliminated, the hand wheel itself acting as a hammer to effectively move the scroll disc and dislodge the connection between the jaws and the work piece.

Figure 5:
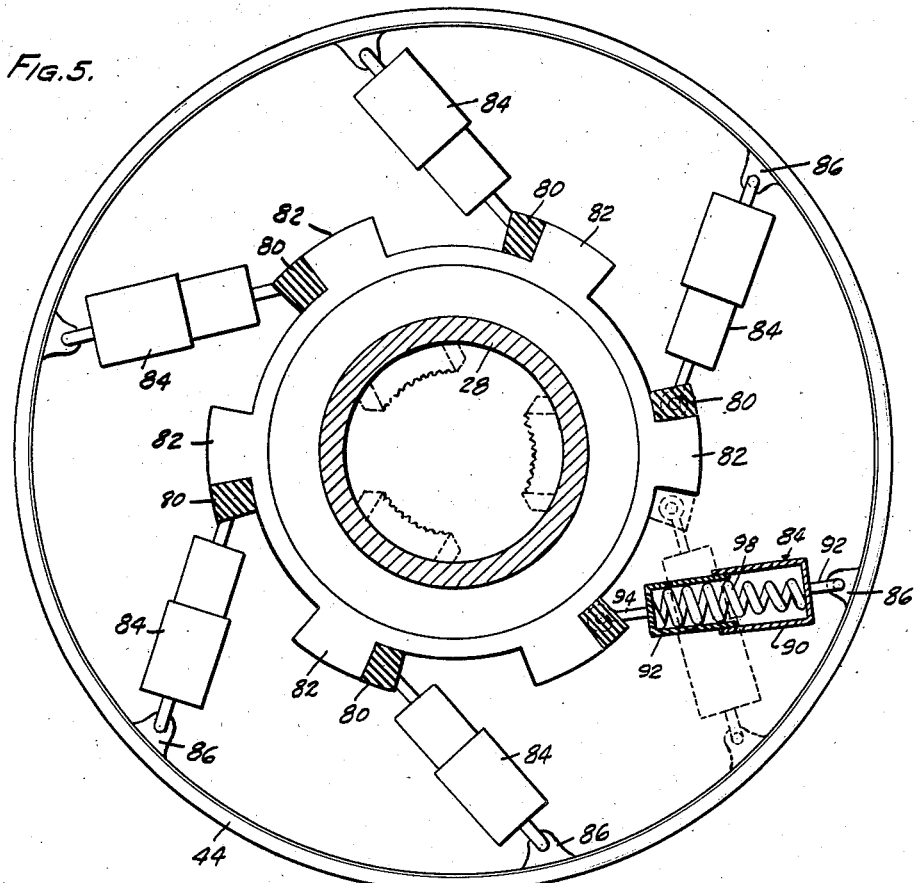
Fig. 5 is a sectional view similar to Fig. 2 of a modified form of the invention wherein spring members are used to effect rotation of the scroll disc in either direction.
Figure 6:
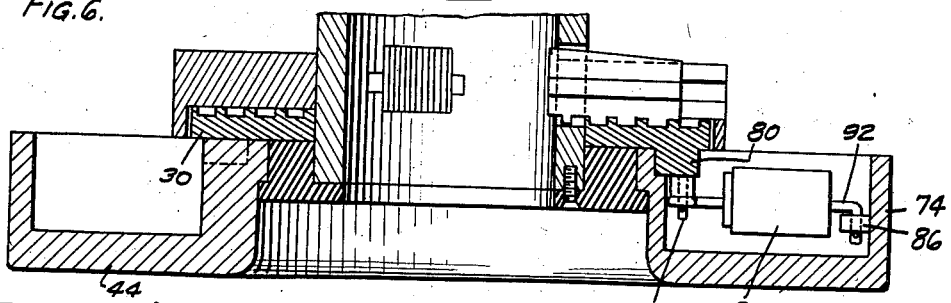
Fig. 6 is a cross-sectional view thereof with the parts in a changed position from that shown in Fig. 5, the scroll disc and associated parts being rotated slightly over 30° from normal position.
Figure 7:
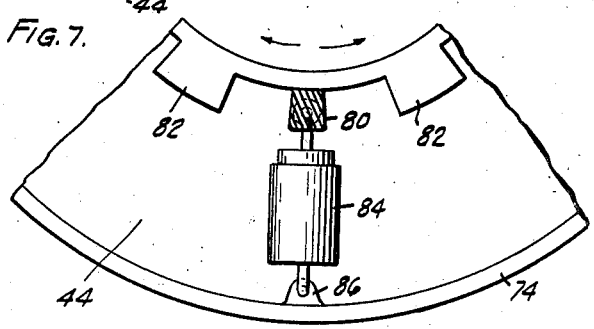
Fig. 7 is a fragmentary plan view showing the location of the spring-loaded unit connected between the hand wheel and the scroll disc at an intermediate position of the parts.

In the embodiment of the invention shown in Figs. 5, 6 and 7 I have provided a plurality of dogs 80 on the back of the scroll disc 30 to cooperate with the hammer lugs 82 formed on the hand wheel 44. In order to effect a hammer blow by the hammer lugs 82 in either directon, that is either clockwise or counter-clockwise, I have provided a spring loaded unit 84 connected between each of the dogs 80 and lugs 86 on the inside of the outer flange 74 of the hand wheel. The unit 84 may comprise a cylindrical cup-shaped member 90 having a center stem 92 pivoted in the lug 86, and a smaller cup-shaped member 92 adapted to be telescopically received by the cup member 90. The cup member 92 has a stem 94 that is pivotally mounted on a pin 96 extending downwardly from a dog 80. A compression spring 98 is positioned within the enclosure formed by the two telescopically connected housings 90 and 92, and when there is relative rotation between the hand wheel 44 and the scroll disc 30, the spring 98 will become compressed or loaded in the housings 90 and 92, thus urging the dog 80 radially in either direction of rotation.

Thus, for example, if it is desired to rotate the scroll disc in one direction, the hand wheel is turned in that direction to a point where the spring will be completely loaded, and slight further angular movement will drive the dog 80 forward under the spring tension therein.

In the embodiment which I have illustrated I have shown six dogs 80 and hammer lugs 82, as well as six spring loaded units 84, so that when the hand wheel is turned approximately 37° in either direction, the spring unit will be loaded and act to drive the scroll disc with a hammer blow.

Figure 8:
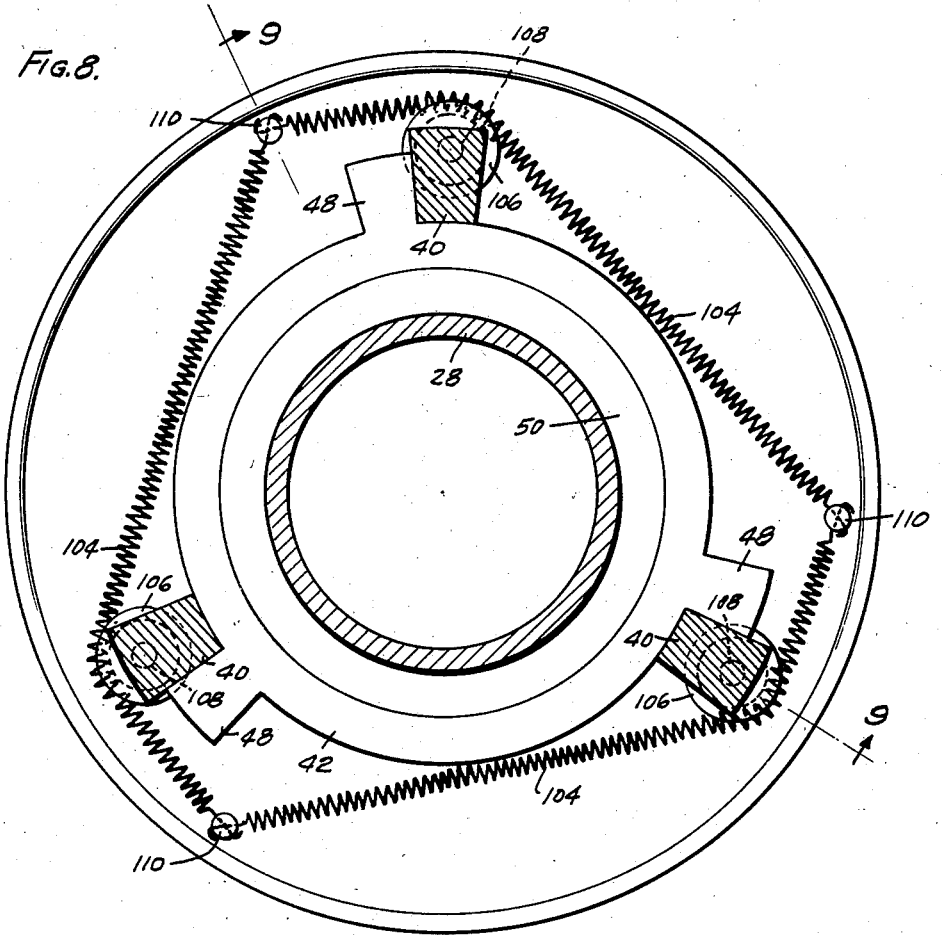
Fig. 8 is a fragmentary cross-sectional view of a portion of a work supporting chuck embodying a further modified form of the invention.
Figure 9:
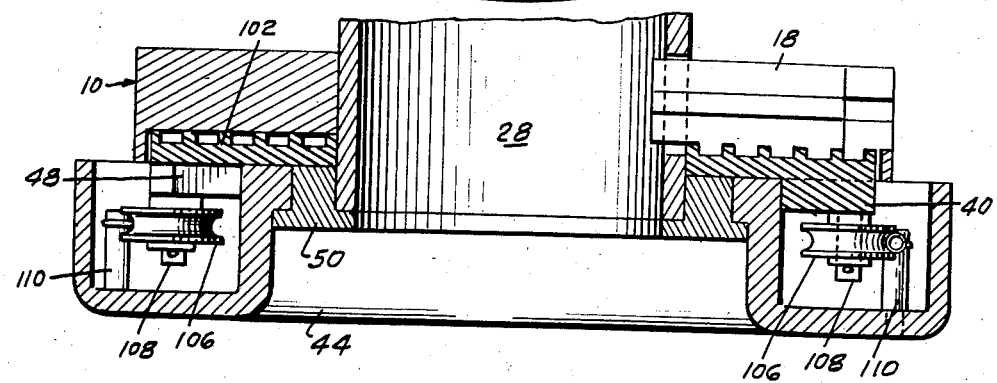
Fig. 9 is a cross-sectional view thereof taken on the line 9—9 of Fig. 8.

In the embodiment of the invention shown in Figs. 8 and 9, I have provided a scroll disc 102 mounted in the chuck housing 10, the collar 50 being provided for holding the hand wheel 44 for rotation, the hand wheel carrying the inner annular ledge 42 and being provided with the hammer lugs 48 for cooperation with the dogs 40 of the scroll disc 30.

Means for effecting a hammer blow in either a clockwise or counter-clockwise direction in this combination may include a plurality of coiled spring members 104 which are trained over pulleys 106 mounted on pins 108 extending downwardly from each of the dogs 40 of the disc scroll 102. The coiled spring members 104 are connected between posts 110 which are fastened in the shell of the handle 44, each post having one end of different spring members 104 connected thereto.

Rotation of the hand wheel of approximately 60° and release, will effect a hammer blow on the dogs of the disc scroll in one direction, whereas a turning of the hand wheel to a slight distance over 60° and release will effect a hammer blow in a counter-clockwise direction. Thus the hammer or pounding effect is obtained for either releasing or tightening the work jaws on a work piece being held in the chuck.

Figure 10:
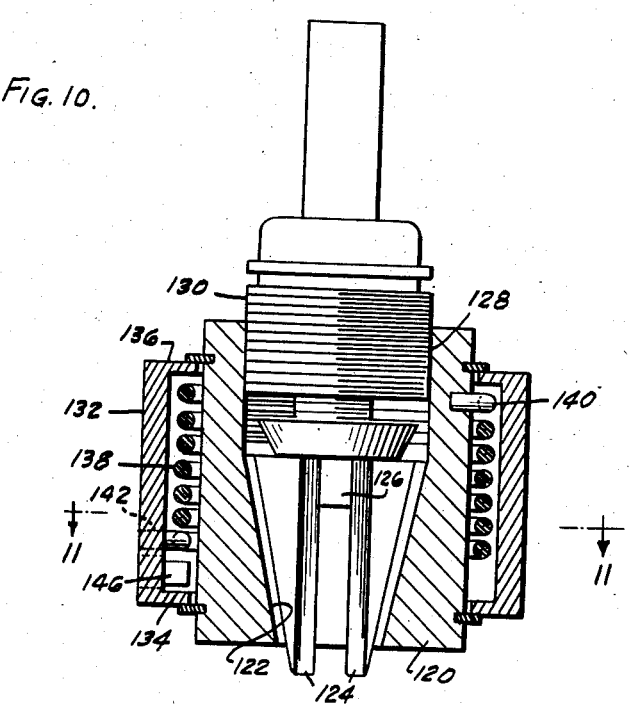
Fig. 10 is a vertical sectional view of a drill chuck embodying my invention.
Figure 11:
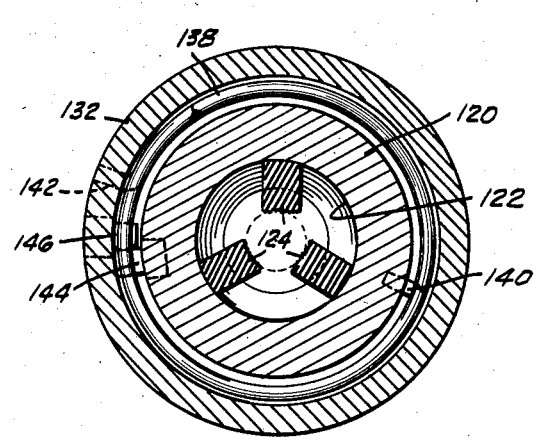
Fig. 11 is a plan sectional view thereof taken on the line 11—11 of Fig. 10.

In Figs. 10 and 11 I have shown the same principle as applied to the usual type of drill chuck, wherein a chuck body 120 which has a tapered inner bore 122 receives therein a plurality of chuck jaws 124. These jaws are usually combined in a holder 126 so that they are moved in an up and down direction simultaneously. The chuck body or collet 120 is screw-threaded at 128 to receive the drive stem 130, which, as it is turned up or down in the tapped opening 128, opens or closes the jaws 124 of the drill chuck.

Means for effecting a rotation of the collet include a hand wheel 132 that has parallel upper and lower ledges 134 and 136 for enclosing a coiled spring 138. One end of the spring 140 may be fastened in the chuck body or collet 120 and then be coiled about the same within the hand wheel 132 and have its opposite end 142 fastened in the hand wheel 132. I provide a pair of engaging dogs 144 and 146, the dog 144 being mounted in the surface of the chuck body 120 and the dog 146 being mounted in the inner wall of the hand wheel 132.

Thus as shown in Fig. 11, when the hand wheel is turned clockwise to approximately 360° to create tension in the spring 138 and is then released, the hand wheel will swing around counter-clockwise and the dog 146 will strike the dog 144 with the impact of the centrifugal action, effecting a prompt loosening of the collet on the drill chuck jaws, in this manner quickly releasing drill bits or other tools that are being held therein.

From the foregoing description it can be seen that the spring loaded unit provided is capable of action either to tighten the jaws on the work or for releasing the same. For either purpose the action of the spring produces a hammer blow which effectively either locks the jaws on the work or releases the jaws from the same.

While I have shown and described a specific embodiment of the invention herein, it will be apparent to those skilled in the art that other variations or forms of spring loaded constructions may be employed. The main objective of the present invention is to provide spring mechanism as described to cooperate with the scroll disc and the hand wheel so that either a tightening or loosening action of the chuck is automatically effected by the spring energy. Thus in effect a very light-weight hand wheel may be employed and the same result will be accomplished as far as tightening is concerned as can now be accomplished with heavy weighted hand wheels. As previously pointed out, light weight is desired in portable equipment, and with this construction a much lighter hand wheel can be used than has heretofore been possible.

I contemplate that changes and modifications may be made in the exact details shown and I do not wish to be limited in any particular; rather what I desire to secure and protect by Letters Patent of the United States is:

1. In combination, a chuck body of the type having a plurality of radially movable work holding jaws, a flat scroll disc having a spiral thread upon one of its faces, teeth on each of said jaws engaging said thread and a hand wheel mounted for rotation adjacent said scroll disc, said scroll disc having radially disposed dogs thereon and said hand wheel having radially disposed hammer lugs for engagement with said dogs, said scroll disc and hand wheel having a spring connection therebetween whereby the spring may be loaded to spin the hand wheel to strike the dogs on the scroll with much greater speed than can be accomplished by hand.

2. In combination, a chuck body of the type having a plurality of radially movable work holding jaws, a scroll disc having a spiral thread upon its forward face, teeth on each of said jaws engaging said thread and a hand wheel mounted for rotation adjacent said scroll disc, said scroll disc having radially disposed dogs thereon and said hand wheel having radially disposed hammer lugs for engagement with said dogs, said scroll disc and hand wheel having a spring connection therebetween whereby the spring may be loaded to spin the hand wheel to strike the dogs on the scroll with much greater speed than can be accomplished by hand, said spring connection being a coiled spring contained within the handle of said hand wheel and having one end fastened into one of said radially disposed dogs.

3. The combination with a chuck body of the type having a plurality of radially movable work holding jaws, a scroll disc having a spiral thread upon its forward face, teeth on each of said jaws engaging said thread and a hand wheel mounted for rotation adjacent said scroll disc, of spring mechanism connected between said hand wheel and scroll disc for tightening or loosening said work holding jaws, said scroll disc having radially disposed dogs thereon and said hand wheel having radially disposed hammer lugs for engagement with said dogs.

4. The combination with a chuck body of the type having a plurality of radially movable work holding jaws, a scroll disc having a spiral thread upon its forward face, teeth on each of said jaws engaging said thread and a hand wheel mounted for rotation adjacent said scroll disc, said scroll disc having radially disposed dogs thereon and said hand wheel having radially disposed hammer lugs for engagement with said dogs, of spring means between said scroll disc and hand wheel for imparting a hammer blow to move said jaws in a tightening direction.

5. A chuck body having a plurality of radially movable work holding jaws, a scroll disc having a spiral thread upon its forward face, teeth on each of said jaws engaging said thread and a hand wheel mounted adjacent said scroll disc for rotating the same, said scroll disc having one or more radially disposed dogs thereon, said hand wheel having one or more radially disposed hammer lugs for engagement with said dogs, and a spring positioned between said hand wheel and scroll disc for effecting a hammer blow between said lugs and said dogs.

6. A chuck body having a plurality of radially movable work holding jaws, a scroll disc having a spiral thread upon its forward face, teeth on each of said jaws engaging said thread and a hand wheel mounted adjacent said scroll disc for rotating the same, said scroll disc and said hand wheel having cooperating dogs thereon and a spring positioned between said hand wheel and scroll disc for effecting a hammer blow between said cooperating dogs.

7. In combination a chuck body of the type having a plurality of movable work holding jaws, a scroll disc having a spiral thread upon its face, teeth on each of said jaws engaging said thread, a hand wheel mounted for rotation adjacent said scroll disc, cooperating dogs between said scroll disc and said hand wheel and spring mechanism connected between said hand wheel and scroll disc.

8. A chusk body having a plurality of radially movable work holding jaws, a scroll disc having a spiral thread upon its forward face, teeth on each of said jaws engaging said thread and a hand wheel mounted adjacent said scroll disc for rotating the same, said scroll disc having one or more radially disposed dogs thereon, a hub for said hand wheel having one or more radially disposed hammer lugs thereon for engagement with said dogs, and a spring positioned between said hand wheel and scroll disc for effecting a hammer blow between said lugs and said dogs, said spring means comprising a spring coiled about said hub and having one end connected to one of said hammer lugs and the other end connected to one of said dogs.

9. A chuck body having a plurality of radially movable work holding jaws, a scroll disc aligned therewith and having a spiral thread upon its forward face, teeth on the back of each of said jaws engaging said spiral teeth, a hand wheel mounted adjacent said scroll disc for rotating the same, said scroll disc having a plurality of radially disposed dogs thereon, said hand wheel having a circular shoulder against which the inner edge of said dogs are positioned, said dogs having curved inner faces matching the radius of said shoulder, a plurality of outwardly projecting hammer lugs forming part of said shoulder and lying in the path of said dogs, and spring means in said hand wheel for moving said dogs when said hand wheel is turned to effect a hammer blow between said lugs and said dogs.

10. In combination, a chuck body of the type having a plurality of radially movable work holding jaws, a scroll disc having a spiral thread upon its forward face, teeth on each of said jaws engaging said thread and a hand wheel mounted for rotation adjacent said scroll disc, said scroll disc having radially disposed dogs thereon and said hand wheel having radially disposed hammer lugs for engagement with said dogs, said scroll disc and hand wheel having a spring connection therebetween whereby the spring may be loaded to spin the hand wheel to strike the dogs on the scroll with much greater speed than can be accomplished by hand, said spring connection being a coiled spring contained within the handle of said hand wheel and having one end fastened into one of said radially disposed dogs and the other end fastened into one of said hammer lugs.

References Cited in the file of this patent
UNITED STATES PATENTS

| 896,711 | Church | Aug. 25, 1908 |
| 2,745,670 | Janik | May 15, 1956 |
| 2,756,061 | Janik | July 24, 1956 |

FOREIGN PATENTS

| 492,665 | Canada | May 5, 1953 |